US012590230B2

(12) United States Patent
Kühl et al.

(10) Patent No.: US 12,590,230 B2
(45) Date of Patent: Mar. 31, 2026

(54) ADHESIVE FILM THAT CAN BE WOUND AND STAMPED

(71) Applicant: LOHMANN GMBH & CO. KG, Neuwied (DE)

(72) Inventors: Oliver Kühl, Straßenhaus (DE); Ruben Friedland, Andernach (DE); Johannes Stahl, Koblenz (DE); Cornelia Hoss, Koblenz (DE)

(73) Assignee: LOHMANN GMBH & CO. KG, Neuwied (DE)

( * ) Notice: Subject to any disclaimer, the term of this patent is extended or adjusted under 35 U.S.C. 154(b) by 371 days.

(21) Appl. No.: 17/413,400

(22) PCT Filed: Dec. 11, 2018

(86) PCT No.: PCT/EP2018/084413
§ 371 (c)(1),
(2) Date: Jun. 11, 2021

(87) PCT Pub. No.: WO2020/119898
PCT Pub. Date: Jun. 18, 2020

(65) Prior Publication Data
US 2022/0064499 A1 Mar. 3, 2022

(51) Int. Cl.
*C09J 7/20* (2018.01)
*C08K 3/16* (2006.01)
(Continued)

(52) U.S. Cl.
CPC ...................................... *C09J 9/00* (2013.01); *C08K 3/16* (2013.01); *C08K 5/0041* (2013.01); *C08K 5/23* (2013.01); *C09J 7/20* (2018.01); *C09J 11/02* (2013.01); *C09J 129/00* (2013.01); *C09J 163/00* (2013.01); *C09J 163/04* (2013.01); *C09J 201/00* (2013.01);
(Continued)

(58) Field of Classification Search
None
See application file for complete search history.

(56) References Cited

U.S. PATENT DOCUMENTS

| | | | | |
|---|---|---|---|---|
| 4,925,727 A | 5/1990 | Brown et al. | | |
| 8,975,312 B2 * | 3/2015 | Jung | ........................ | C08L 63/00 528/121 |

(Continued)

FOREIGN PATENT DOCUMENTS

| | | |
|---|---|---|
| DE | 102011013645 A1 | 9/2012 |
| EP | 0889106 A1 | 1/1999 |

(Continued)

OTHER PUBLICATIONS

First Chinese Office Action for corresponding Chinese patent application No. 201880100195.3, 19 pages, dated Nov. 28, 2022.

(Continued)

*Primary Examiner* — Frank D Ducheneaux
(74) *Attorney, Agent, or Firm* — Natalie Albrecht

(57) ABSTRACT

An adhesive film that can be wound and stamped having an epoxy-based adhesive compound that can be activated thermally or by UV radiation, and a dye and/or pigment mixed into the adhesive compound for producing a first color change after the activation of the adhesive compound and a second color change after the curing of the adhesive compound.

14 Claims, 1 Drawing Sheet

(51) Int. Cl.

| | |
|---|---|
| ***C08K 5/00*** | (2006.01) |
| ***C08K 5/23*** | (2006.01) |
| ***C09J 9/00*** | (2006.01) |
| ***C09J 11/02*** | (2006.01) |
| ***C09J 129/00*** | (2006.01) |
| ***C09J 163/00*** | (2006.01) |
| ***C09J 163/04*** | (2006.01) |
| ***C09J 201/00*** | (2006.01) |

(52) U.S. Cl.
CPC .... *C09J 2301/408* (2020.08); *C09J 2301/416* (2020.08); *C09J 2463/00* (2013.01)

(56) References Cited

U.S. PATENT DOCUMENTS

| | | | | |
|---|---|---|---|---|
| 9,512,340 | B2* | 12/2016 | Wigdorski | C08G 59/687 |
| 10,385,160 | B2 | 8/2019 | Weippert | |
| 2011/0120614 | A1 | 5/2011 | Sugo et al. | |
| 2014/0171552 | A1 | 6/2014 | Zaffaroni et al. | |
| 2018/0155575 | A1* | 6/2018 | Anderson | B32B 17/10 |
| 2019/0077997 | A1 | 3/2019 | Demarez et al. | |
| 2019/0276711 | A1* | 9/2019 | Anderson | B32B 27/36 |
| 2019/0300760 | A1 | 10/2019 | Makino et al. | |
| 2020/0040237 | A1 | 2/2020 | Kopf et al. | |

FOREIGN PATENT DOCUMENTS

| | | | |
|---|---|---|---|
| EP | 1437392 | A1 | 7/2004 |
| EP | 3105276 | B1 | 1/2018 |
| JP | 4611463 | B2 | 1/2011 |
| WO | 2017174303 | A1 | 10/2017 |
| WO | 2018153985 | A1 | 8/2018 |
| WO | 2018008742 | A1 | 5/2019 |

OTHER PUBLICATIONS

International Search Report for corresponding international (PCT) application PCT/EP2018/084413, 9 pages, dated Aug. 27, 2019.
Written Opinion for corresponding international (PCT) application PCT/EP2018/084413, 13 pages, dated Aug. 27, 2019.
3105276 B1 XP Jan. 31, 2018 Weippert.
International Preliminary Report on Patentability, International Patent Application No. PCT/EP2018/084413, issued on. Jun. 8, 2021, published on Jun. 15, 2021, The International Bureau of WIPO, 9 pages.

* cited by examiner

ADHESIVE FILM THAT CAN BE WOUND AND STAMPED

CROSS REFERENCE TO RELATED APPLICATIONS

This application is a national stage U.S. patent application of International Application No. PCT/EP2018084413, filed on Dec. 11, 2018, the entirety of which is incorporated herein by reference.

TECHNICAL FIELD

The present disclosure relates to an adhesive film that can be wound and stamped which can be activated and cured thermally or by ultraviolet radiation (UV) for structural adhesive bonds with color change following activation, which is pressure-sensitive adhesive in its non-activated state. In this sense, wherever UV-activation is referenced in the following, thermal activation is inferred as a possible alternative, as well.

The terminology used in the descriptions below is to be understood as follows:

"Adhesive film" hereinafter relates to any type of laminar adhesive systems, i.e. not only adhesive tapes in the stricter sense of the word but also adhesive films, adhesive strips, adhesive plates or adhesive stamped parts.

"Pressure-sensitive adhesive" refers to adhesive bonds where the two join partners are bonded together by way of an intermediary adhesive layer and subject to pressure. The bond is reversible in that it can be released again without damaging the two join partners, because the adhesive seam is the weakest link in the adhesive bond.

"Structural" adhesive bonds are such bonds where the join partners are bonded in such a manner that, in the event of separation, the bond is not necessarily released at the adhesive seam, but under certain circumstances also one of the join partners may constitute the weakest link in the bond, instead, which is then damaged by the separation. This means that structural adhesive bonds possess high strength levels. Strength levels, measured by way of a quasi-static tensile shear test, are in excess of 6 MPa for structural bonds. Typical aspirational values for structural adhesive bonds of epoxy adhesives are between 10 to 20 MPa.

"Radiation curing" refers to a process where, using high-energy irradiation, reactive materials are conveyed from a low-molecular to a high-molecular state.

In the present case, UV-radiation is understood to be "UVA" or "UVC" light.

UVA-radiation is in a wavelength range of ca. 380 to 315 nanometres (nm), UVC-radiation is in a wavelength range of ca. 280 to 100 nm. Generally, both constitute electromagnetic radiation at wavelengths shorter than visible light. For UVA light, the energy input is ca. 3.26 to 3.95 electron volts (eV), for UV-C light, the energy input is ca. 4.43 to 12.40 eV.

"Activation" means initiating a curing process by irradiation with UV-light, i.e. the photo initiators contained in the adhesive are activated by light irradiation and trigger the curing process by initiating the formation of polymer chains. Customarily, UV-curing adhesives are irradiated after the join partners have been joined. For this, substrates are required that are sufficiently permeable for the UV-radiation used. The adhesion seam is irradiated until the curing has progressed sufficiently, i.e. sufficient strength has been obtained. Consequently, only UV-permeable substrates can be activated and glued together that way. Final adhesive compound strength is only achieved upon completion of the curing process.

The "open time" is the time between the application of the adhesive and the bonding. During the open time, for example, a liquid melt adhesive will spread across the surfaces to be bonded, thus providing for the requisite adhesion. Given that the viscosity of an adhesive generally increases after application, time constitutes a limiting factor in respect of the open time of adhesives.

The "curing time" is the period between the joining of the join partners and the final strength of the bond.

The "dark reaction" refers to the fact that a curing reaction is initiated (triggered) by short-term irradiation of the adhesive with UV-light, thus effecting complete curing without additional irradiation.

Thermal activation refers to initiating the curing process by applying increased temperature, i.e. a temperature of at least 140° C. in the present case.

"Superacid" means the following: In cationic UV-curing, a ring opening occurs at the oxirane and/or oxetane (epoxy resins and vinyl ether). This is achieved by way of photolysis e.g. of diaryliodononium salts, which effects the generation of strong proton acids, also referred to as superacids. The acid proton opens the epoxy ring and sets off the chain growth and thus the curing.

DESCRIPTION OF THE RELATED ART

Often, the basis of UV-curing adhesives consists in acrylate monomers or oligomers that cure in a UV-induced radical chain reaction.

UV-curing epoxy adhesives in turn are cured by a cationic photo initiator. In cationic UV-curing, a ring opening occurs at the oxirane and/or oxetane (epoxy resins and vinyl ether). This is achieved by way of photolysis e.g. of diaryliodononium salts, which is based on the generation of strong proton acids. The acid proton opens the epoxy ring and sets off the chain growth and thus curing.

In contrast to radical UV-curing of acrylates, this results in reduced shrinking and good adhesion properties in respect of a large number of substrates. Insensitivity towards oxygen is another advantage of cationic curing, allowing for high curing speeds under regular air conditions. Humidity and alkaline conditions, in turn, tend to be of more influence than in radical UV-curing.

In cationic UV-initiation, it is possible under certain circumstances to delay chain formation to such an extent that it ultimately can occur in the dark without further exposure to radiation. Chain formation may potentially also be substantially delayed so that it is only reactivated or re-accelerated by heat treatment. "Trigger radiation", i.e. a brief kick-start by radiation, is sufficient to start the curing. Further curing then occurs in the optional subsequent dark reaction-away from the UV-light. Under these circumstances it is even possible that a certain "open time" is created, i.e. first the open adhesive layer is irradiated and afterwards there is time to perform the joining with the second substrate without impairing the ultimate bonding properties. This approach would then allow for bonding substrates that are not UV-transparent.

WO 2017/174303 A1 relates to a pressure-sensitive adhesive tape consisting of a radiation-activatable polymerisable composition consisting of: 5 to 60 parts by weight of at least one polyurethane-polymer film former component; 40 to 95 parts by weight of at least one epoxy component; 0.1 to 10 parts by weight of at least one photo initiator, and optionally 0.1 to 200 parts by weight of at least one additive, based in each case on the radiation-activatable polymerisable composition, wherein the parts by weight of components A and B add up to 100.

WO 2018/153985 A1 provides an adhesive film that can be wound and stamped including an epoxy-based adhesive compound that can be activated by UV-radiation: 2-40 percent by weight of film former; 10-70 percent by weight of aromatic epoxy resins; cycloaliphatic epoxy resins, wherein the cycloaliphatic epoxy resins do not exceed 35 percent by weight; 0.5-7 percent by weight of cationic initiators; 0-50 percent by weight of epoxidised polyether compounds; and 0-20 percent by weight of a polyol, wherein the proportions add up to 100%.

In industrial contexts in general, requirements for adhesive bonds are ever increasing, for example in terms of breaking strength, temperature resilience, changing climate resilience, humidity heat resilience, etc. This is due to the fact that adhesive tapes are used increasingly in automotive manufacturing, e.g. for weight reasons or also because it is not necessarily required to create point-shaped bonds, instead, even distribution of the bonding strength is achieved across an adhesive seam, and last but not least also because the join partners are not damaged as is the case with certain other joining procedures involving, e.g., screwed links or riveting.

In many processes, e.g. in the automotive industry, the manufacturers of adhesive compounds/adhesive tapes are required to ensure and prove the activation or curing thereof. Accordingly, there are high requirements associated with process control in the processing of these adhesive compounds.

UV-activatable liquid adhesive compounds help overcome this issue, which are suitable to indicate activation by color change. EP 3 105 276 B1 for example describes an irreversible color change of an epoxy adhesive from blue to yellow.

Also known in the art is the bathochromic effect, also referred to as red shift, which describes a color shift. Here, the absorption spectrum is shifted to the long-wave lower energy range of the electromagnetic spectrum. (cf. K. Schwetlick: Organikum. 15th edition, VEB Deutscher Verlag der Wissenschaften, Berlin 1976, p. 513 et seq.)

In turn, this color shift can be effected also by the halochromic effect ("salt color"), which describes the color change of a substance depending on the charge state of its molecules. One example thereof is litmus, which changes its color from red (acidic) to blue (alkaline) depending on the pH value of an aqueous solution.

Using the extant systems, it is currently only possible to indicate activation in liquid adhesives. Accordingly, there is a need for similar process control options to cover structural adhesive films, as well. Moreover, there is need to determine not only the moment in time when the curing process is activated for such process control but also the moment in time when sufficient curing has been achieved.

BRIEF DISCLOSURE

The present disclosure provides an adhesive film that can be wound and stamped which has a color change after the activation by UV-radiation or temperature in order to indicate activation and which has a repeated color change after curing, thus allowing for process control, as well as a corresponding method for manufacturing such a film.

An adhesive film that can be wound and stamped comprising an epoxy-based adhesive compound activatable thermally or by UV-radiation is described. According to the disclosure, the adhesive compound comprises a dye and/or a pigment mixed into the adhesive compound for producing a first color change after the activation of the adhesive compound and a second color change after the curing of the adhesive compound.

This allows for a in-process control that, apart from indicating the start of an activation of the adhesive compound, additionally color-indicates the progress of the cross-linking reaction of the adhesive compound so that the curing status can be rendered visible. In this context, the prior art offers nothing in terms of a UV-activatable adhesive film based on epoxy-based adhesive compounds in which no further initiator is required as radical starter for activation except for the cationic photo initiator, and that exhibits a color change due to the addition of a dye or pigment after activation that may serve process control purposes.

Open time, shelf life and curing speed of the adhesive compounds used are not affected by the addition of corresponding dyes or pigments.

The adhesive film in hand allows for complete process control of the UV-activation by means of color change during the joining process of available applications of the UV-activatable adhesive compounds. For example, by adding the dye Sudan blue, an adhesive dyed blue can be produced that color changes to pink-violet after UV-activation. After a period of ca. 24 hours, the color hue of the adhesive once again shifts back to blue, which is due to the decomposition or the depletion reaction of the acid contained in the adhesive. Thus, the user has control over the activation and reactivity state of the adhesive film, respectively.

The processing and coating of the adhesive compound can be carried out using a solvent or hotmelt process. Also the so-called syrup technology, in which the film-forming part is built up from monomers or oligomers only during the coating process, can be used for processing and coating.

The adhesive film is pressure-sensitive adhesive in its non-activated state and can thus be handled just like any "ordinary" pressure-sensitive adhesive tape, i.e. it can be applied subject to mild adhesion and can also be repositioned. Stamped parts can be manufactured from the adhesive tape that can be activated by UV-light prior to application on the respective parts to be bonded in order to generate a (semi-)structural compound after cross-linking.

Typically, also liners (release liners) are a component of adhesive tapes. Here, as a general rule, all ubiquitously known types of release liners can be used.

The curing of the adhesive films and stamped parts is finally activated using UV-light, preferably UVA or UV-C-light. Then the join partners are finally and structurally joined. Given that the curing reaction takes place in several steps, also after activation a certain period remains during which the parts to be joined can be finally adjusted and joined, additional activation by UV-light is no longer necessary after the curing has been triggered.

The duration of the dark reaction strongly depends on different factors such as, for example, the epoxy resin component used (cycloaliphatic or aromatic epoxy resin), the chain length, the initiator type, the irradiation time, the radiation dosage (UV-wavelength) or also the temperature. The curing time after irradiation can amount to between 10 seconds and 60 minutes depending on the aforementioned factors and their interaction.

In an embodiment, 0.001 to 0.2 percent by weight, preferably 0.01 to 0.07 percent by weight and particularly preferably 0.015 to 0.04 percent by weight of the dye or the pigment, respectively, are mixed into the adhesive compound. In concentrations of less than 0.001 percent by weight the coloration of the adhesive compound is no longer sufficiently visually detectable to provide satisfactory process liability, in concentrations higher than 0.2 percent by weight the dye or the pigment and their amine groups or nitrogen compounds create an alkaline milieu, preventing a reaction of the superacid with the epoxy groups and an azo group.

In a further development, the dye or the pigment is an azo dye or an azo pigment. In particular, dyes or pigments are advantageous that exhibit color change subject to acid exposure. Examples thereof are methyl red, methyl orange, Congo red and alizarin yellow R.

Dyes or pigments of the azo group are causal for the color change. They change color due to protonation when pH values fall under certain values. Below, the azo dye is represented in an exemplary fashion by methyl red, which occurs in red and in its protonated form in acidic media (the right structure copied in below) and in yellow and in its deprotonated form in alkaline media (the left structure copied in below).

In an embodiment, the adhesive film that can be wound and stamped is suitable in particular for the structural bonding of metals, glass, ceramics, fibreglass-reinforced plastics (FRP), carbon-fibre-reinforced plastics (CRP) and other high-energy surfaces.

In a further embodiment, the adhesive film that can be wound and stamped has adhesion strength values between 6 and 20 MPA depending on the formulation details, radiation dosage and adhesive substrates.

In another embodiment, the adhesive film that can be wound and stamped is suitable for (semi-) structural bonding of plastics and further low-energy surfaces.

BRIEF DESCRIPTION OF THE FIGURES

Embodiments of the disclosure are illustrated in further detail by the subsequent description of the Figures. In this.

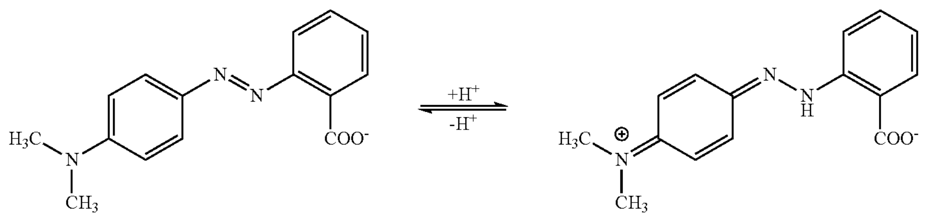

Subject to increased atmospheric humidity, the color change is less pronounced, because the resulting acid particles preferably attach to the OH<-> ions of the water and thus to a lesser extent to the dye or the pigment, respectively. Simultaneously, in these cases the cured adhesive tape is less densely cross-linked, which manifests itself in decreased strength values in tensile testing and associated increased elongation at break values.

In yet another embodiment, the adhesive compound comprises:

a. 2-50 percent by weight of film formers,
b. 10-70 percent by weight of aromatic epoxy resins,
c. 0.5-7 percent by weight of a cationic initiator,
d. 0.001-0.2 percent by weight of a dye or pigment
e. cycloaliphatic epoxy resins, wherein the cycloaliphatic epoxy resins do not exceed 35 percent by weight,
f. 0-50 percent by weight of epoxidised polyether compounds, and
g. 0-20 percent by weight of a polyol, wherein the proportions add up to 100%.

The adhesive compound has an open time of 10 seconds to 60 minutes after UV-activation, during which the film is tacky, before it has cured completely and reached its final strength.

In a further development, the adhesive film is provided as a UV-activatable transfer adhesive tape without backing.

In a further development, the adhesive film comprises different adhesive compound systems, at least one of which is a UV-activatable system.

In a further development, the adhesive film comprises a UV-transparent or a UV-non-transparent backing.

In an embodiment, the adhesive film comprises at least one UV-activatable or thermally activatable adhesive compound.

Figure 3:
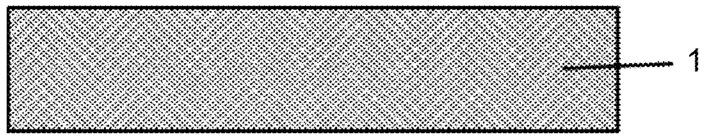
Figure 4:
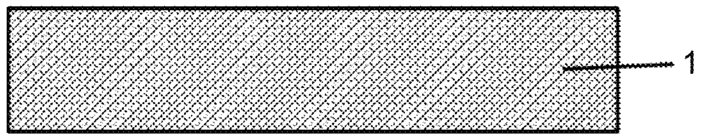

FIG. 3 schematically shows a color change of the UV-activatable adhesive compound immediately after activation; and FIG. 4 schematically shows a color change of the UV-activatable adhesive compound 24 h after activation.

DETAILED DESCRIPTION

Various embodiments now will be described more fully hereinafter with reference to the accompanying drawings, which form a part hereof, and which show, by way of illustration, specific embodiments by which the innovations described herein can be practiced. The embodiments can, however, be embodied in many different forms and should not be construed as limited to the embodiments set forth herein; rather, these embodiments are provided so that this disclosure will be thorough and complete, and will fully convey the scope of the embodiments to those skilled in the art. The following detailed description is, therefore, not to be taken in a limiting sense.

Throughout the specification and claims, the following terms take the meanings explicitly associated herein, unless the context clearly dictates otherwise. The term "herein" refers to the specification, claims, and drawings associated with the current application. The phrase "in an embodiment" as used herein does not necessarily refer to the same embodiment, though it can. Furthermore, the phrase "in another embodiment" as used herein does not necessarily refer to a different embodiment, although it can. Thus, as described below, various embodiments can be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Described hereinafter is the manufacture of an adhesive film and its UV-activation with reference to the accompanying Figures. Samples were produced using the manufacturing method described herein. The samples were subjected to various examinations to test their properties. The results of the tests are described in detail below.

The adhesive compound has the composition as described above.

Figure 1:
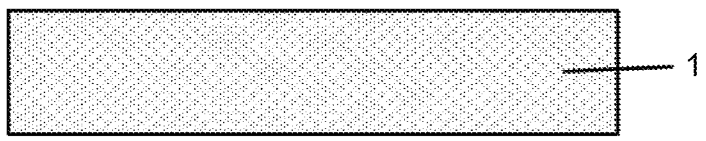
FIG. 1 schematically shows a UV-activatable adhesive compound prior to activation.

FIG. 1 schematically shows a UV-activatable adhesive compound 1. Adhesive compound 1 comprises the following composition:

a. 2-50 percent by weight of film formers,
b. 10-70 percent by weight of aromatic epoxy resins,
c. 0.5-7 percent by weight of a cationic initiator,
d. 0.001-0.2 percent by weight of a dye or pigment
e. cycloaliphatic epoxy resins, wherein the cycloaliphatic epoxy resins do not exceed 35 percent by weight,
f. 0-50 percent by weight of epoxidised polyether compounds, and
g. 0-20 percent by weight of a polyol, wherein the proportions add up to 100%.

Following UV-activation, the adhesive compound has an open time of 10 seconds to 60 minutes, during which the film is tacky.

The dye and the pigment, respectively, preferably is an azo dye or an azo pigment and in particular such an azo substance that exhibits color change after exposure to acid.

Table 1 lists a few exemplary dyes usable in the adhesive compounds:

TABLE 1

| | |
|---|---|
| Fat Blue B 01 | Blue anthraquinone dye by the company Clariant Produkte (Deutschland) GmbH. |
| Orasol Yellow 081 | Yellow metal complex dye by the company BASF Colors & Effects GmbH. |
| Heliogen Green L 8730 | Green halogenated copper phthalocyanine pigment by the company BASF Colors & Effects GmbH. |

Color change after UV-activation or thermal activation occurs at additive volumes between 0.001 and 0.2 percent by weight of the dye and the pigment, respectively. In concentrations of less than 0.001 percent by weight, the coloration of the adhesive compound is no longer sufficiently visually detectable to provide satisfactory process liability, in concentrations higher than 0.2 percent by weight, the dye or the pigment and their amine groups or nitrogen compounds create an alkaline milieu, preventing a reaction of the superacid with the epoxy groups and an azo group.

The experiments resulted in a range of 0.01 to 0.07 percent by weight and particularly preferably of 0.015 to 0.04 percent by weight of the dye or the pigment, respectively.

Subject to increased atmospheric humidity, the color change is less pronounced, because the resulting acid particles preferably bond to the OH<-> ions of the water and thus to a lesser extent to the dye or the pigment, respectively. Simultaneously, in these cases the cured adhesive tape is less densely cross-linked, which manifests itself in decreased strength values in the tensile test and associated increased elongation at break values.

The adhesive compound containing solvents is applied to a siliconised polyester film (thickness: 50 μm) using a coating knife. Then it first is dried at room temperature for 10 minutes and then at 80° C. in a convection oven for 10 minutes. The amount to be applied is set such that after drying (removal of the solvent mixture) a pressure-sensitive adhesive (tacky) film with a thickness of 150 μm is obtained.

No protective measures against UV-light are necessary during handling of the raw materials, the adhesive or for the coating. It is sufficient to work under regular laboratory conditions away from the UV-lamp. No further shielding is required.

Figure 2:
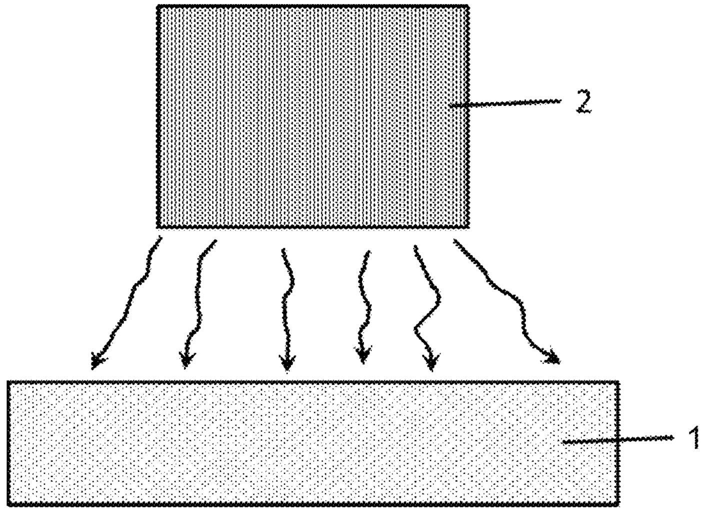
FIG. 2 schematically shows a UV-activation of the UV-activatable adhesive compound of FIG. 1.

FIG. 2 schematically shows the UV-activation of the UV-activatable adhesive compound 1 by means of a UV source 2. The UV-source may for example be UV-C light from a discharging lamp or UV-A light from a UV-A-LED source.

Tests with a UV-C lamp are carried out in a UV lab device by the company Beltron with a conveyor belt and a UV-C radiator with a radiation maximum at 256 nm. The conveyor belt is operated at 2 m/min. The radiation dosage in the UV-C range, measured using a UV Power Puck II by the company EIT Instrument Market Group, amounts to 197 $mJ/cm^2$.

In the alternative, regardless of a substantially higher wavelength, the adhesive compounds can also be activated with a UV-LED device. Similar irradiation times as in the UV-C device are feasible and the results regarding open time and adhesion strength are in the same range.

Tests with a UV-LED device are carried out with a LED Spot lamp 100 by the company Hönle, comprising a UV-LED (wavelength 365 nm) and an irradiation chamber. The samples are irradiated in the irradiation chamber for 15 seconds. The radiation dosage, measured using a UV Power Puck II by the company EIT Instrument Market Group, amounts to 5000 $mJ/cm^2$.

FIG. 3 shows the adhesive compound 1 after a first color change, triggered by the UV-activation. The cause of the color change is the dye or the pigment contained in the adhesive compound in the form of an azo dye or azo pigment. Dyes and pigments of the azo group are capable of changing color by protonation when the pH values fall below an appropriate level.

FIG. 4 schematically shows the color change of a UV-activatable adhesive compound 1 24 h after activation. This adhesive compound has fully reacted in terms of its cross-linking status in relation to the temperature provided during the cross-linking.

Below, the terms open time, time until handling strength and curing time are specified in further detail.

Open time is considered the maximum feasible period between the removal from the irradiation belt (UV-C) or removal from the irradiation chamber (UV-A), respectively, and the point in time of the joining with the second substrate. During this period, the join parts can be joined. The open time is defined such that the adhesive layer is still pressure-sensitive adhesive (tacky) during this period. It is determined by finger checking the tackiness of the surface of the adhesive films after irradiation. Directly after irradiation, the adhesive film is still tacky. After a certain time, the degree of tangible tack decreases and continues to decrease until eventually the surface is non-tacky. The open time is determined as per the point in time when tack tangibly decreases so that afterwards no tack remains.

It turns out that as long as the surfaces are still tacky, joining is possible and the subsequent curing results in a homogeneous adhesive bond. As soon as the surfaces lose tack, the curing process has advanced so much already that no joining is possible any longer. This is reflected in the significantly reduced strength values determined based on the quasi-static tensile shear strength.

Additionally, by way of this new color change for such adhesive films, activation can be detected, and the additional color change over time following activation allows for a determination of the open time. The adhesive films are joined directly after UV-activation.

Curing time: The curing time is the period between the joining and the final strength. All sample formulations are fully cured after a maximum of 24 hours. Therefore, in most cases the waiting time was 24 hours before the quasi-static tensile shear strength was measured. When a value of more than 6 MPa is achieved, structural strength or structural bonding is obtained. Due to the added dye and the added pigment, respectively, the color hue allows for the determination whether the formulation has cured completely. This state is shown in FIG. 4. Adhesive compound 1 has fully reacted in terms of its cross-linking status in relation to the temperature provided during the cross-linking.

For usage, a sufficient open time is desired. Swift achievement of handling strength is advantageous in case the bond has to withstand a first load soon after joining (e.g. during transport of the parts) or in order to omit fixing the parts, respectively. For full curing, however, 24 hours is sufficient because according to experience only after that amount of time the bond is subjected to the final load (permanent load or shock loads).

Open time and curing time are consequences of the reaction speed of the curing reaction. This reaction starts with the UV-activation and ends with the full curing of the adhesive film. Curing is complete once the final strength of the adhesive bond has been achieved. During the open time and the curing time, different phases with different reaction speeds may take place, there may be delays and accelerations resulting in a specific overall open time and curing time. The open time and the curing time can be controlled via the formulation, the irradiation type and intensity and duration as well as thermal management (temperatures) during the bonding process.

The time until handling strength means the period that elapses after the joining step until the strength of the bond is so high that bonded parts can be transported and processed further. Experience has shown that handling strength is achieved once the quasi-static shear strength has reached 2 MPa. This strength allows for sufficient tolerance for the loads during an industrial manufacturing process.

Test Methods a) Color Change

The color change is observed visually and documented photographically. The process is documented prior to activation by temperature or UV-radiation, immediately following activation and 24 hours after activation. The indicated color hue reflects to the perception of five different observers involved in the test.

b) Quasi-Static Tensile Shear Test

In order to determine parameters for the adhesive strength on FRP, tensile shear tests are carried out according to DIN EN 1465 (2009) at 23° C.±2° C. and 50%±5% relative humidity at a testing speed of 2 mm/min. The substrates are cleaned with isopropanol and joined afterwards. The curing is achieved using UV light, and the mechanical check is performed 24 h after activation. The results are indicated in MPa (N/mm$^2$). The figures stated are the mean value based on five measurements including standard deviation.

c) Peel Test

The peel resistance of the cured adhesive tapes on glass is determined according to DIN EN 1939 (1996) at 23° C.±2° C. and 50%±5% relative humidity at a testing speed of 100 mm/min and a peel-off angle of 90°. The samples are cured using UV light and tested 24 h after activation. The results are indicated in N/mm. The figures stated are the mean value based on five tear resistance measurements including standard deviation.

d) Tensile Test

In order to determine parameters for the strength of the adhesive film alone in its cured state, tensile tests are carried out according to DIN EN 527 (2012) at 23° C.±2° C. and 50%±5% relative humidity at a testing speed of 10 mm/min. To this end, strips of a width of 19 mm and of a length of 100 mm are cut out from cured adhesive films. In the results illustrated, the layer thickness amounts to 0.2 mm. The samples are cured using UV light and tested 24 h after activation. The results are indicated in MPa (N/mm$^2$). The figures stated are the mean value based on five measurements including standard deviation.

EXAMPLES

Table 2 summarises examples regarding the compositions in respect of the selection of the dyes or pigments, with the volume specifications indicating parts by weight. K1 to K4 are formulations according to the disclosure with dyes and pigments, respectively. V1 is an adhesive transfer film without added dye or pigment:

TABLE 2

| Example: | K1 | K2 | K3 | K4 | V1 |
|---|---|---|---|---|---|
| Adhesive Compound (AC) | AC 1 | AC 1 | AC 1 | AC 1 | AC 1 |
| Fat Blue B01 | 0.02 | 0.01 | — | — | — |
| Orasol Yellow 081 | — | 0.02 | 0.02 | — | — |
| Heliogen Green L8730 | — | — | — | 0.19 | — |

Table 3 summarises the results of the tensile shear, tensile and peel tests as well as the color change.

TABLE 3

| Example: | K1 | K2 | K3 | K4 | V1 |
|---|---|---|---|---|---|
| Tensile shear strength [MPa] | 6.8 ± 1.0 (CF) | 7.1 ± 0.7 (CF) | 7.7 ± 0.9 (CF) | 0.3 ± 0.1 (AF) | 6.7 ± 1.0 (AF/CF) |

TABLE 3-continued

| Example: | K1 | K2 | K3 | K4 | V1 |
|---|---|---|---|---|---|
| Resistance to peel [N/mm] | 0.73 ± 0.02 (AF) | 0.58 ± 0.12 (AF) | 0.44 ± 0.03 (AF) | Nicht messbar | 0.79 ± 0.06 (AF) |
| Tensile strength [MPa] | 1.9 ± 0.1 | 1.6 ± 0.1 | 1.7 ± 0.1 | Nicht messbar | 2.1 + 0.5 |
| Color change immediately after activation (visual) | From cyan blue to pink-violet | From green to colorless | No color change | No color change | No color change |

Key: AF: Adhesion Failure; CF: Cohesion Failure

Adhesive films K1 and K2, K3, K4 and V1 all feature the same UV-activatable adhesive compounds. Only the respective dye or pigment, respectively, was varied to illustrate differences in the selection of the colorants.

The adhesive films according to K1, K2, K3 and V1 are not significantly different in terms of tensile shear strength and peel resistance within the range of the standard deviation. Thus, it is shown that the use of the colorant or the pigment for activation and curing control, respectively, has no negative effect on these mechanical parameters. The peel resistance of the adhesive films according to K1 and V1 is within the range of the standard deviation without significant differences, too. Here, the peel resistance values of the formulations K2 and K3 are slightly decreased, which is due to the influence of the yellow dye.

K4 exhibits no measurable tensile strength and peel resistance, the tensile shear strength is on the same level as in the non-cured adhesive film. Hence, it was possible to render proof of the upper dye or pigment concentration.

Table 4 shows the state where the adhesive films were conditioned in a different manner prior to activation. In example K5, the adhesive compound was applied on the adhesive surface without direct ingress of moisture. In example K6, the adhesive compound was conditioned at 70% relative atmospheric humidity for one hour and subsequently activated.

TABLE 4

| Example: | K5 | K6 |
|---|---|---|
| Adhesive Compound (AC) | AC 1 | AC 1 |
| Fat Blue B01 | 0.02 | 0.02 |
| Temperature [° C.] | 23 ± 2 | 23 ± 2 |
| Relative atmospheric humidity [%] | Without direct ingress of moisture in respect of the adhesive surface | 70 ± 5 |

Table 5 summarises the results of the tensile tests and the color change immediately after activation.

TABLE 5

| Example: | K5 | K6 |
|---|---|---|
| Tensile strength [MPa] | 1.4 ± 0.1 | 0.8 ± 0.1 |
| Elongation at break [%] | 200 ± 10 | 400 ± 40 |
| Color change immediately after activation (visual) | From cyan blue to pink-violet | From cyan blue to light blue |

The tensile strengths of the adhesive films according to K5 and K6 show a difference in terms of tensile strength and elongation at break within the range of the standard deviation. Elongation at break is twice as high at 400% for the adhesive film stored subject to increased atmospheric humidity for one hour. Tensile shear strength of the adhesive film stored in the absence of direct ingress of moisture is ca. 0.6 MPa higher compared to the adhesive film conditioned at 70% relative atmospheric humidity. The difference is significant in terms of color change, too. In adhesive film K5, a color change from cyan blue to pink-violet was detected immediately after activation, whereas in K6, subject to increased ingress of humidity, only a color change from cyan blue to light blue could be detected. Hence, it was possible to prove the influence of the ambient atmospheric humidity on color change and tensile strength and elongation at break, respectively.

Insofar as applicable, all individual features illustrated in the sample embodiments can be combined and/or exchanged without leaving the scope of the disclosure.

LIST OF REFERENCE NUMERALS

1 adhesive compound
2 UV radiation source

The invention claimed is:

1. An adhesive film that can be wound and stamped, comprising:
- a UV curable epoxy-based adhesive compound that is activated by UV radiation; and
- a dye and/or pigment mixed into the adhesive compound that produces a first color change after the UV activation of the adhesive compound and a second color change after a UV curing of the adhesive compound,
- wherein the UV curable adhesive compound of the adhesive film comprises a cationic initiator that is activated by the UV radiation, and the dye and/or pigment comprises a substance that produces the first color change as an effect of an acid produced by the UV activation of the cationic initiator and the second color change due to a decomposition of the acid after UV curing of the UV curable adhesive compound.

2. The adhesive film of claim 1, wherein the dye and/or pigment is mixed into the adhesive compound in an amount ranging from 0.001 to 0.2 percent by weight, based on the total weight of the adhesive compound.

3. The adhesive film of claim 2, wherein the dye and/or pigment is mixed into the adhesive compound in an amount of 0.01 to 0.07 percent by weight.

4. The adhesive film of claim 3, wherein the dye and/or pigment is mixed into the adhesive compound in an amount of 0.015 to 0.04 percent by weight.

5. The adhesive film of claim 2, wherein the dye and/or the pigment is an azo dye or an azo pigment.

6. The adhesive film of claim 1, wherein the dye and/or pigment is an azo dye or an azo pigment.

7. The adhesive film of claim 1, wherein the adhesive compound comprises:
- a. 2 to 50 percent by weight of film formers,
- b. 10 to 70 percent by weight of aromatic epoxy resins, c. 0.5 to 7 percent by weight of the cationic initiator, d. 0.001 to 0.2 percent by weight of the dye and/or pigment, e. cycloaliphatic epoxy resins, wherein the cycloaliphatic epoxy resins do not exceed 35 percent by weight, f. 0 to 50 percent by weight of epoxidised polyether compounds, and g. 0 to 20 percent by weight of a polyol, wherein the proportions add up to 100%.

8. The adhesive film of claim 7, wherein the dye and/or pigment is an azo dye or an azo pigment.

9. The adhesive film of claim 1, wherein the adhesive film is a UV-activatable transfer adhesive tape without backing.

10. The adhesive film of claim 1, wherein the adhesive film comprises a UV-transparent backing.

11. The adhesive film of claim 1, wherein the adhesive film comprises a UV-non-transparent backing.

12. The adhesive film of claim 1, wherein the dye and/or pigment is selected from the group consisting of: methyl red, methyl orange, Congo red, alizarin yellow R, Fat Blue B01, Orasol Yellow 081, Heliogen Green L8730, and combinations thereof.

13. The adhesive film of claim 1, wherein the adhesive film has a structural bond after the UV curing.

14. The adhesive film of claim 13, wherein the structural bond of the adhesive film has a quasi-static tensile shear strength of more than 6 MPa.

* * * * *